(12) United States Patent
Beinvel et al.

(10) Patent No.: US 9,230,243 B2
(45) Date of Patent: Jan. 5, 2016

(54) COLLABORATIVE DESIGN USING DUPLICATED WORKSPACES

(75) Inventors: Jacques Beinvel, Paris (FR); Yann Lancien, Paris (FR)

(73) Assignee: Dassault Systemes, Velizy Villacoublay (FR)

( * ) Notice: Subject to any disclaimer, the term of this patent is extended or adjusted under 35 U.S.C. 154(b) by 159 days.

(21) Appl. No.: 13/273,153

(22) Filed: Oct. 13, 2011

(65) Prior Publication Data
US 2013/0097234 A1   Apr. 18, 2013

(51) Int. Cl.
| | |
|---|---|
| G06F 15/16 | (2006.01) |
| G06F 17/20 | (2006.01) |
| G06F 17/30 | (2006.01) |
| G06Q 10/10 | (2012.01) |
| G06F 17/24 | (2006.01) |

(52) U.S. Cl.
CPC ............ *G06Q 10/103* (2013.01); *G06Q 10/101* (2013.01); *G06F 17/24* (2013.01)

(58) Field of Classification Search
CPC .............. G06Q 10/101–10/103; G06Q 10/10; G06F 17/2288–17/24; G06F 17/30; G06F 17/50; G06F 17/30309
USPC .......... 709/203–206; 715/205, 223–234, 236, 715/777, 741, 763, 775, 255; 707/695, E17, 707/999.1, 608, 999; 716/102
See application file for complete search history.

(56) References Cited

U.S. PATENT DOCUMENTS

| | | | |
|---|---|---|---|
| 5,678,040 A * | 10/1997 | Vasudevan et al. | |
| 5,961,590 A * | 10/1999 | Mendez et al. | 709/206 |
| 6,067,551 A | 5/2000 | Brown et al. | |
| 6,151,610 A * | 11/2000 | Senn et al. | 715/236 |
| 6,212,534 B1 | 4/2001 | Lo et al. | |
| 6,314,425 B1 | 11/2001 | Serbinis et al. | |
| 7,028,057 B1 * | 4/2006 | Vasudevan et al. | 707/695 |
| 7,249,314 B2 | 7/2007 | Walker et al. | |
| 7,814,049 B2 | 10/2010 | Aboukrat et al. | |
| 7,814,429 B2 * | 10/2010 | Buffet et al. | 715/763 |
| 7,941,399 B2 | 5/2011 | Bailor et al. | |
| 2002/0065848 A1 * | 5/2002 | Walker et al. | 707/511 |
| 2003/0158871 A1 * | 8/2003 | Fomenko | 707/203 |
| 2004/0133577 A1 * | 7/2004 | Miloushev | G06F 11/1076 |
| 2005/0262485 A1 | 11/2005 | Plante | |
| 2006/0031811 A1 | 2/2006 | Ernst et al. | |

(Continued)

OTHER PUBLICATIONS

"A Web-Service-based Open-Systems Architecture for Achieving Heterogeneity in Synchronous Collaborative Editing Systems" by Preston and Prasad, Georgia State University Research Paper published in 2006.*

(Continued)

*Primary Examiner* — Quang N Nguyen
*Assistant Examiner* — Raji Krishnan
(74) *Attorney, Agent, or Firm* — Hamilton, Brook, Smith & Reynolds, P.C.

(57) ABSTRACT

A computer-implemented method includes storing data in a memory area such that the data is organized into a plurality of workspaces including a first workspace, creating a second workspace within the memory area, and copying at least a portion of the data from the first workspace into the second workspace. The method also includes enabling simultaneous editing of the first workspace and the second workspace, comparing the first workspace and the second workspace, and synchronizing the first workspace and the second workspace based on the comparison.

18 Claims, 7 Drawing Sheets

(56) References Cited

U.S. PATENT DOCUMENTS

| | | |
|---|---|---|
| 2006/0290978 A1 | 12/2006 | Springer et al. |
| 2007/0136662 A1* | 6/2007 | Khaba ............... G06F 17/2229 715/202 |
| 2007/0150551 A1* | 6/2007 | Krishnan ............ G06Q 10/10 709/218 |
| 2007/0186157 A1* | 8/2007 | Walker et al. ................. 715/530 |
| 2009/0100368 A1* | 4/2009 | Look et al. .................... 715/775 |
| 2009/0210459 A1* | 8/2009 | Nair et al. ..................... 707/203 |
| 2009/0320035 A1 | 12/2009 | Ahlgren et al. |
| 2010/0005125 A1* | 1/2010 | Mendez et al. ............... 707/203 |
| 2010/0070882 A1* | 3/2010 | Wang ..................... G06F 17/24 715/753 |
| 2010/0169485 A1* | 7/2010 | Hazlewood ......... H04L 61/1523 709/225 |
| 2011/0078246 A1* | 3/2011 | Dittmer-Roche ............. 709/205 |
| 2012/0109592 A1* | 5/2012 | Potter .................... G06F 17/50 703/1 |
| 2012/0109883 A1* | 5/2012 | Iordanov et al. .............. 707/608 |
| 2013/0097234 A1* | 4/2013 | Beinvel et al. ................ 709/204 |
| 2013/0212485 A1* | 8/2013 | Yankovich et al. ........... 715/741 |

OTHER PUBLICATIONS

"A Web-Service-based Open-Systems Architecture for Achieving Heterogeneity in Synchronous Collaborative Editing Systems" by Preston and Prasad, presentation slides in CIC 2006 in Hong Kong.*

"An Efficient Synchronous Collaborative Editing System Employing Dynamic Locking of Varying Granularity in Generalized Document Trees" paper by Preston and Prasad in CIC 2006.*

Search Results of google search for collaborative editing articles by Preston.*

* cited by examiner

COLLABORATIVE DESIGN USING DUPLICATED WORKSPACES

BACKGROUND OF THE INVENTION

The embodiments described herein relate generally to collaborative development activities and, more particularly, to creating an online isolated workspace that duplicates all or at least part of an original workspace.

Rapid and clear exchange of ideas is of paramount importance when a design team is working on a project. However, unless members of a design team are working intimately and in close proximity, the exchange of ideas is often ineffective and incomplete. For example, a design team may be spread across various departments within an organization, or in different geographic locations, so that team members cannot engage in a spontaneous dialogue. Moreover, the members of a design team are increasingly spread across different companies, in different industries, and even different countries. When a design team involves such a diversity of members, an efficient and spontaneous exchange of ideas is often nonexistent.

In existing systems, ideas that underlie designs are often shared by a team in an anachronistic and time-consuming manner, such as by sketches sent by fax, or by verbal communications over the telephone. Much of the detail or rationale of a design is lost in this manner. Similarly, the intermediate steps that led to a design, including ideas that were considered but not explored, are not communicated. Thus, a member of a team in a location remote from the source of the idea may engage in a repetition of the design process that led to a design proposal, since he did not have the benefit of observing the evolution of the idea. To be more effective, some design teams may schedule periodic face-to-face meetings. However, such meetings lead to loss of productivity from travel time and costs.

Various attempts have been made to facilitate the exchange of ideas through a simultaneous design effort. For example, "asynchronous" collaborative design has been attempted, wherein a design is resident on a central server connected to several team members (clients). While this is helpful, it suffers from a number of drawbacks. Since the model is resident on the central server, all design activity ceases in the event that the server is not functioning. Also, in such a system, only one team member can modify the model at a time. Each team member must wait while a member of the team modifies the design, and each team member must wait for the server to transmit the results to each team member. The design can progress in only one direction at a time. Furthermore, the volume of data that must be transmitted is large, which slows the process substantially.

SUMMARY OF THE INVENTION

In one aspect, a computer-implemented method includes storing data in a memory area such that the data is organized into a plurality of workspaces including a first workspace, creating a second workspace within the memory area, and copying at least a portion of the data of the first workspace into the second workspace. The method also includes enabling a user of one of a plurality of client computers to edit one of the first workspace and the second workspace, comparing the first workspace and the second workspace, and synchronizing the first workspace and the second workspace based on the comparison.

In another aspect, a computer system includes a plurality of client computers, a memory area, and a server operatively coupled to the memory area. The memory area is configured to store data organized into a plurality of workspaces including a first workspace, and the server is configured to create a second workspace within the memory area and copy at least a portion of the data of the first workspace into the second workspace. The server is also configured to enable a user of one of the plurality of client computers to edit one of the first workspace and the second workspace, compare the first workspace and the second workspace, and synchronize the first workspace and the second workspace based on the comparison.

In another aspect, a computer program product includes one or more computer-readable storage media having computer-executable components for use in user collaboration. The components include a data management component that when executed by a processor causes the processor to store data in a memory area such that the data is organized into a plurality of workspaces including a first workspace. The components also include a workspace management component that when executed by a processor causes the processor to create a second workspace within the memory area and copy at least a portion of the data of the first workspace into the second workspace. The workspace management component also causes the processor to enable a user of one of a plurality of client computers to edit one of the first workspace and the second workspace, compare the first workspace and the second workspace, and synchronize the first workspace and the second workspace based on the comparison.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

The details of one or more embodiments of the invention are set forth in the accompanying drawings and the description that follows. Other features, objects, and advantages of the invention will be apparent from the description and drawings, and from the claims.

DETAILED DESCRIPTION OF THE INVENTION

A description of example embodiments of the invention follows.

The teachings of all patents, published applications and references cited herein are incorporated by reference in their entirety.

Exemplary embodiments of methods, systems, and computer program products having computer-readable media for use in collaborative work among multiple users are described herein. The embodiments described herein facilitate providing simultaneous, collaborative workspace usage. Duplicated online data can be accessed by multiple users with appropriate privileges from any user computer or workstation. In addition, duplicating the data enables modifications to be made without these modifications being seen by users of other workspaces before synchronization occurs. This limits the impact on the second users of the modifications made by the first users. Because no data is stored locally, data security is enhanced. Moreover, because workspace duplication is handled by a server that also hosts the data itself, only the resources of the server and network limit the size of the workspaces.

Figure 1:
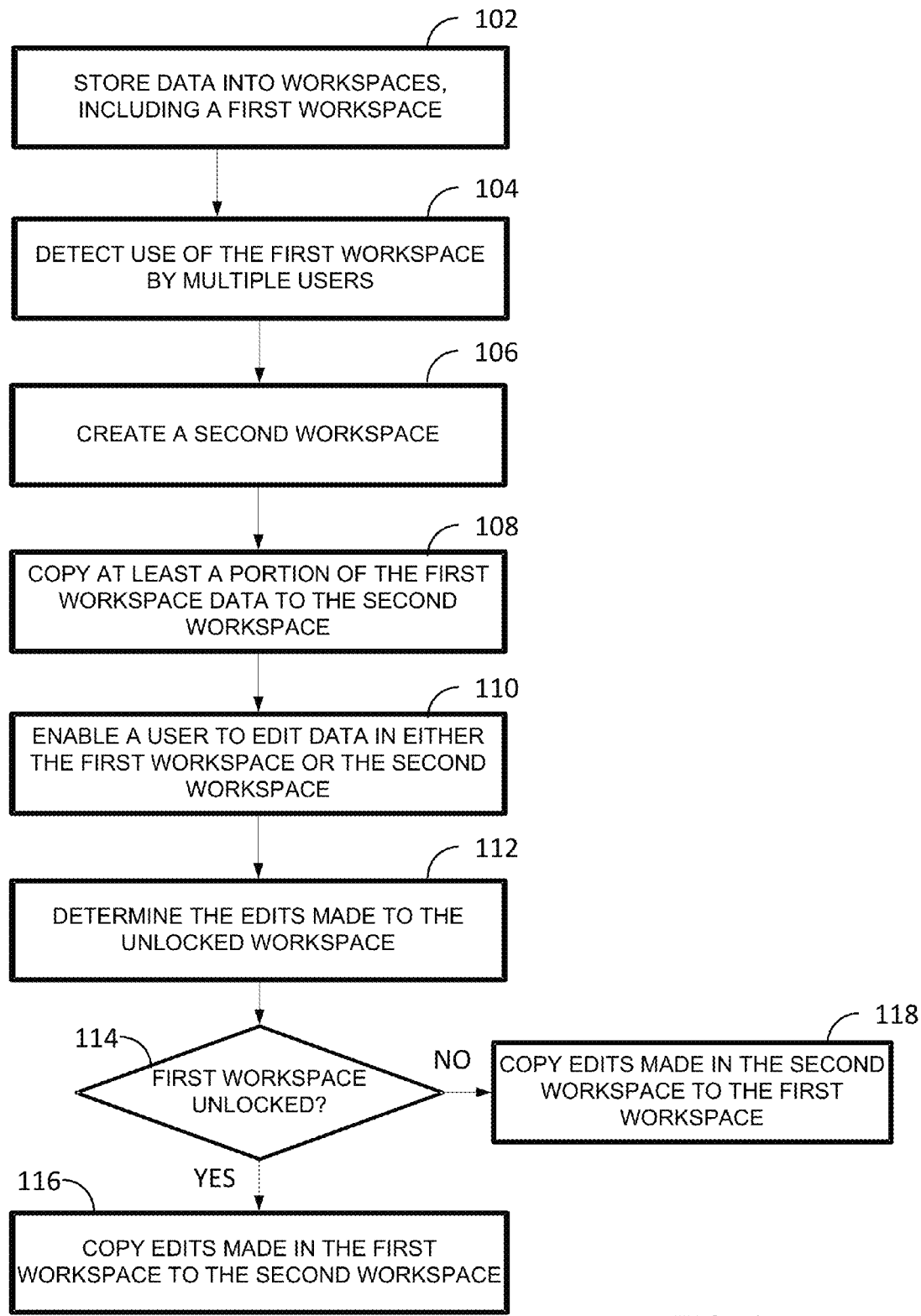
FIG. 1 is a flowchart illustrating an exemplary computer-implemented method for use in providing simultaneous, collaborative workspace usage.
Figure 2:
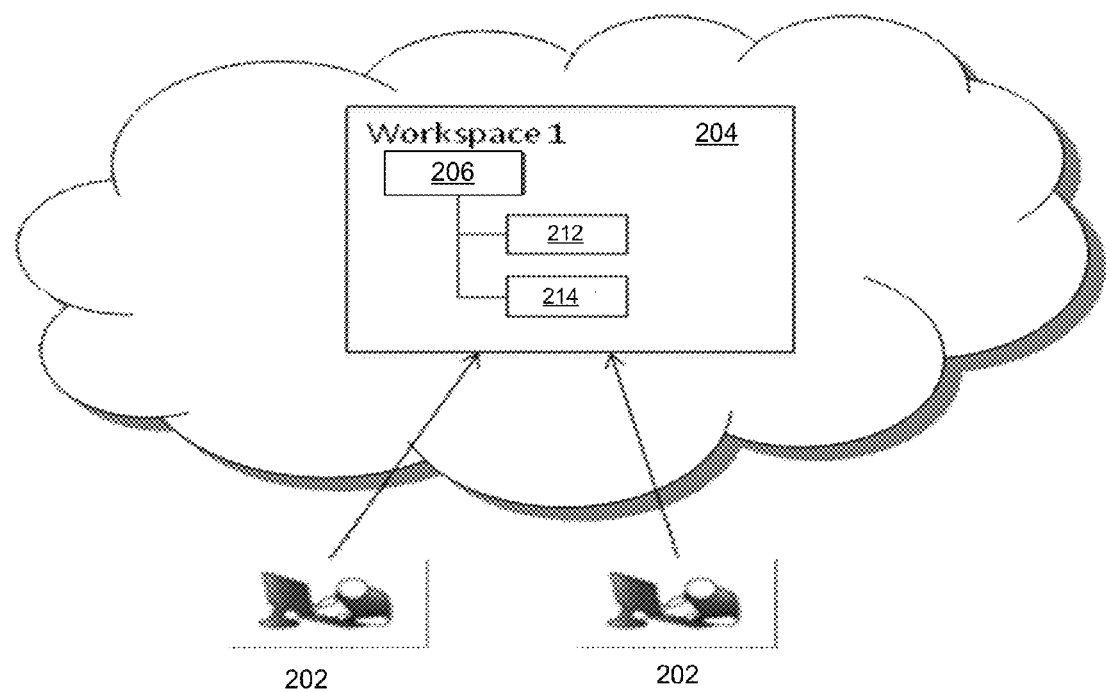
FIGS. 2-9 are illustrations of the computer-implemented method shown in FIG. 1 between multiple workspaces.

Referring now to the drawings, wherein like reference numerals designate identical or corresponding parts throughout the several views, embodiments described herein relate to systems, methods, and computer-readable storage media for use in work among multiple users. FIG. 1 is a flowchart illustrating an exemplary computer-implemented method for use in providing simultaneous, collaborative workspace usage. In an exemplary embodiment, multiple users initiate a computer application using computer systems coupled to a memory area, or using any other suitable computer device. The computer application may be, for example, a computer-aided design (CAD) application, a computer-aided engineering (CAE) application, a word processing application, a data entry or spreadsheet application, or any other suitable application that enables collaborative work. The memory area stores 102 data organized into one or more workspaces. In an exemplary embodiment, and as shown in FIG. 2, the users 202 initially access a first workspace 204 that includes one or more data sets, such as a first data set 206. In some embodiments, the first workspace 204 is secured such that the access to the first workspace 204 requires that the users 202 are granted appropriate privileges. During use of the computer application, the users work on the same data, such as the first data set 206. The first data set 206 and/or any other data within the first workspace 204 may be representative of a modeled object, such as a solid-surface model of a real-world object that is presented in a viewing area of a display device. Alternatively, the first data set 206 and/or any other data within the first workspace 204 may be any other suitable data type that can be used in collaborative work.

Figure 3:
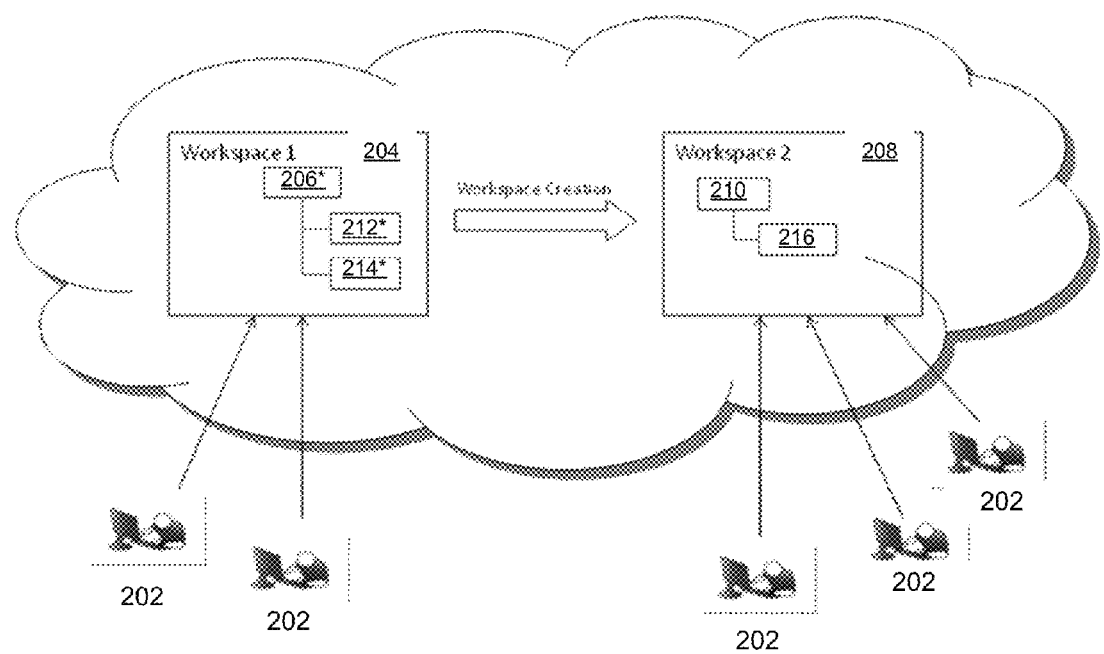

In an exemplary embodiment, a server system, administrator system, and/or a collaborative management software detects 104 that multiple users 202 are accessing and working on the first data set 206 and/or any other data within the first workspace 204. As shown in FIG. 3, a second workspace 208 is created 106 for use by other users 202. The server system, administrator system, and/or collaborative management software may automatically create the second workspace 208 based on a predefined trigger, such as the number of simultaneous users 202 or any other suitable trigger. Alternatively, one of the users 202 may have a privilege that enables him to cause the server system, administrator system, and/or collaborative management software to create the second workspace 208.

Moreover, and in an exemplary embodiment, at least a portion of the data within the first workspace 204, such as the first data set 206, is copied 108 into the second workspace 208 to create a second data set 210. It should be understood that the scope of the data may be different between the first workspace 204 and the second workspace 208. For example, the server system or the creating user may choose which data is copied into the second workspace 208. In addition, user privileges may be different between the first workspace 204 and the second workspace 208. For example, a user 202 accessing the first workspace 204 may be unable to access the second workspace 208 or may be able to access the second workspace 208 but unable to modify the second data set 210. Similarly, a user 202 having the necessary privileges to access the second workspace 208 may be unable to access the first workspace 204 or may be able to access the first workspace 204 but unable to modify the first data set 206. In an exemplary embodiment, a correspondence between the original data in the first workspace 204 and the copied data in the second workspace 208 are stored in the memory area for subsequent synchronization.

Furthermore, at any time, a data that is present in both the first workspace 204 and the second workspace 208 can be modified or edited in only one of those workspaces. The server system, administrator system, and/or collaborative management software manages this using an editor token in order to prevent conflicts between the multiple data sets and/or workspaces. For example, in an exemplary embodiment, the server system, administrator system, and/or collaborative management software assigns the editor token to either the first data set 206 or the second data set 210 since the second data set 210 is a copy of the first data set 206. As another example, when the first data set 206 includes a third data set 212 and a fourth data set 214, a fifth data set 216 is created within the second data set 210 as a copy of either the third data set 212 or the fourth data set 214. In such an example, editor token to either the fifth data set 216 or the original data set from which the fifth data set 216 is copied (i.e., either the third data set 212 or the fourth data set 214). Use of the editor token facilitates synchronization of the global workspaces, for example. As such, an in an exemplary embodiment, editing of data in either the first workspace 204 or the second workspace 208 is enabled 110 by the server system, administrator system, and/or collaborative management software.

Figure 4:
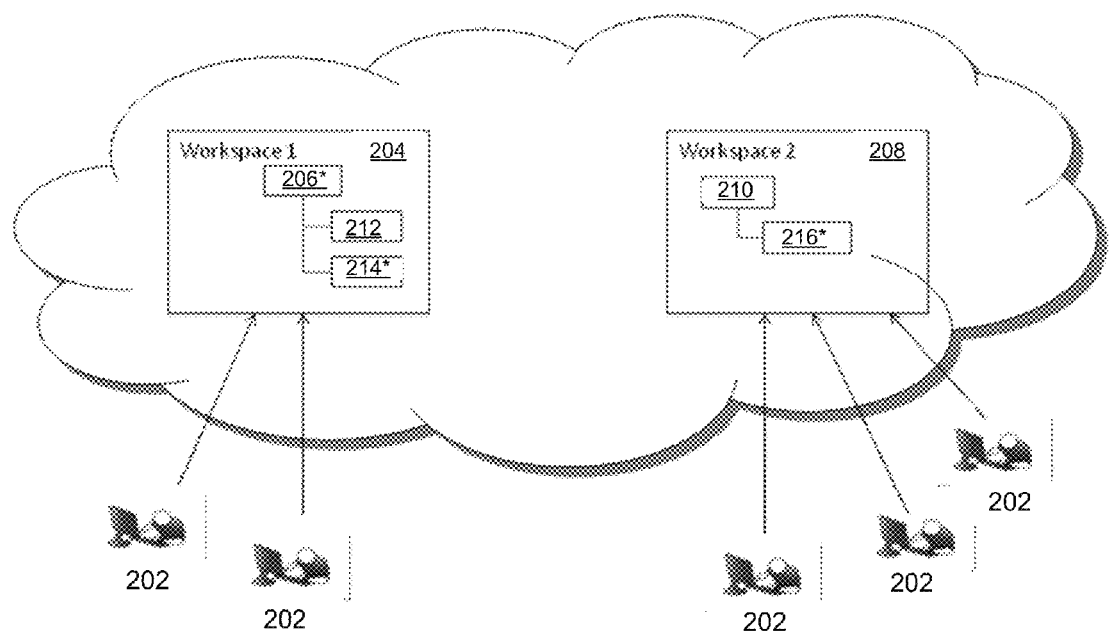

FIGS. 3 and 4 illustrate use of the editor token in order to prevent conflicts between the multiple data sets and/or workspaces. During creation of the second workspace 208, first data set 206 was copied from the first workspace 204 to the second workspace 208 as the second data set 210. Moreover, the third data set 212 was copied from the first workspace 204 to the second workspace 208 as the fifth data set 216. The fourth data set 214 was not copied to the second workspace 208. As shown in FIG. 4, the server system, administrator system, and/or collaborative management software has enabled 110 editing of the first data set 206 (identified using "*" in FIG. 4), which locks editing of the second data set 210. Similarly, the server system, administrator system, and/or collaborative management software has enabled 110 editing of the fifth data set 216 (identified using "*" in FIG. 4), which locks editing of the third data set 212. The server system, administrator system, and/or collaborative management software has also enabled 110 editing of the fourth data set 214 (identified using "*" in FIG. 4), but this does not affect a lock on any other data set because the fourth data set 214 was not copied into the second workspace 208.

Figure 5:
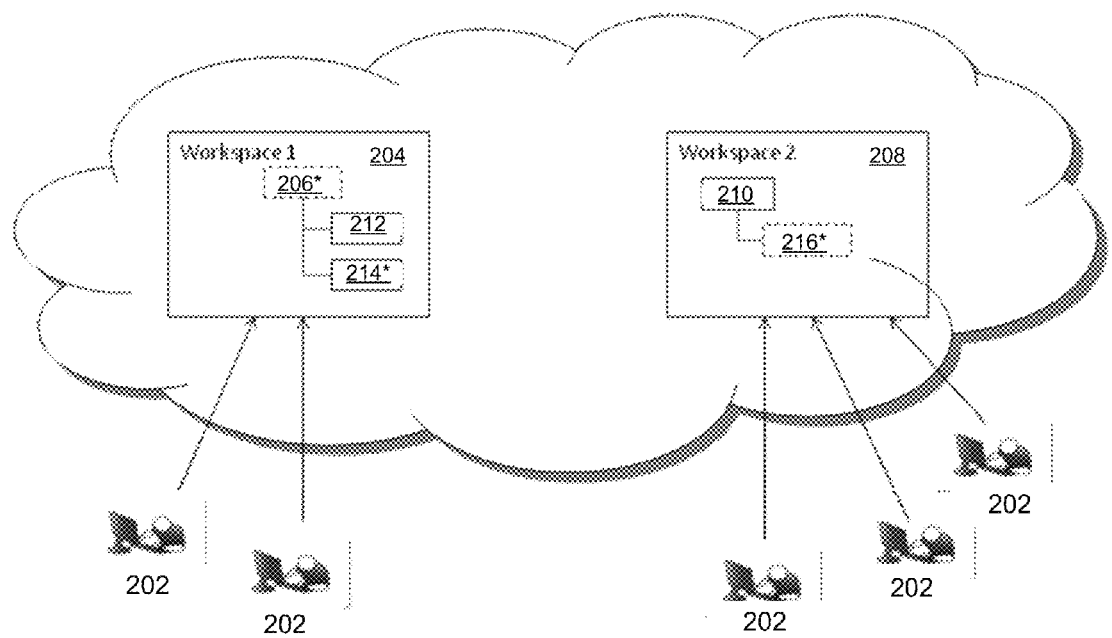

In an exemplary embodiment, when a user 202 edits data in one workspace the copy of that data is unchanged in other workspaces. As shown in FIG. 5, where modified data is shown using a dashed line, one user 202 modifies the first data set 206 and another user 202 modifies the fifth data set 216. The modification of the first data set 206 is not automatically replicated into the second workspace 208 and the modification of the fifth data set 216 is not automatically replicated into the first workspace 204.

Moreover, in an exemplary embodiment, the server system, administrator system, and/or collaborative management software determines 112 the edits made to the unlocked workspace and/or to individual data sets. For example, the server system, administrator system, and/or collaborative management software compares the modified first data set 206 to the locked second data set 210 to determine the extent of the changes. In some embodiments, the results of the comparison are stored in the memory area for tracking purposes.

Synchronization of the first and second workspaces 204 and 208 may be automatic based on a timing mechanism or some other trigger, may be user-driven, or may be some combination of automatic and manual. For example, synchronization may be a manual operation and automatic after a preselected time period to ensure that the comparison of the first and second workspaces 204 and 208 is made and stored at some minimum periodicity. During synchronization, whether manual or automatic, the server system, administrator system, and/or collaborative management software determines the desired direction of synchronization. For example, the server system, administrator system, and/or collaborative management software may determine that data in the first workspace 204 was modified based on the comparison or based on whether the data to be synchronized in the first workspace 204 is locked or unlocked using the editor token. If, for example, the server system, administrator system, and/or collaborative management software determines 114 that the first workspace 204 is unlocked, then modifications are copied from the first workspace 204 into the second workspace 208. More specifically, the modifications to the first data set 206, for example, are copied 116 to the second data set 210. Conversely, if the server system, administrator system, and/or collaborative management software determines 114 that the first workspace 204 is locked, then modifications are copied 118 from the second workspace 208 into the first workspace 204. More specifically, the modifications to the second data set 210, for example, are copied 118 to the first data set 206.

Figure 6:
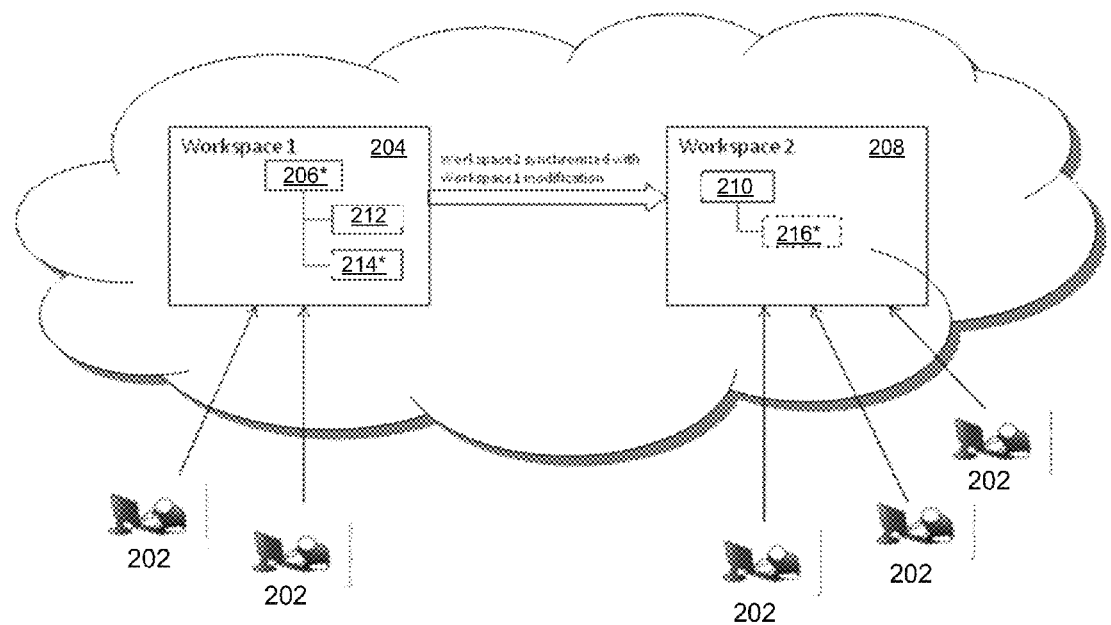
Figure 7:
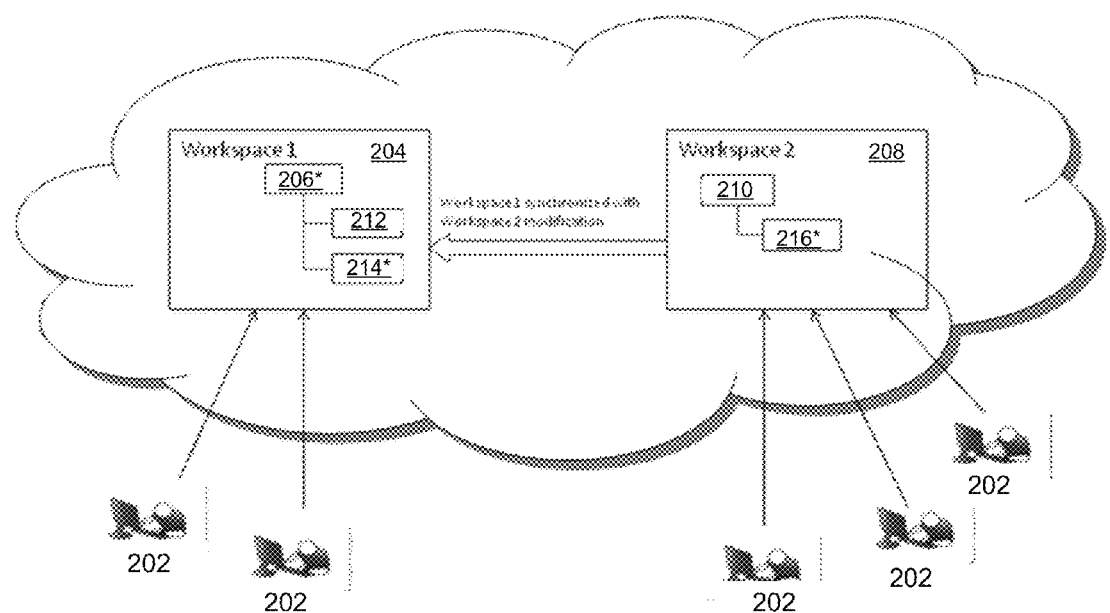

FIGS. 6 and 7 illustrate synchronization between the first and second workspaces 204 and 208. As shown in FIG. 6, the second workspace 208 is synchronized with the first workspace 204. Specifically, the server system, administrator system, and/or collaborative management software propagates the modification done in the first workspace 204 to the second workspace 208. More specifically, the modifications made to any data of the first workspace 204 that is marked with the editor token, such as the first data set 206, is propagated to the second data set 210 so the users 202 of the second workspace 208 can take into account these modifications in their work. In some embodiments, the users 202 are alerted that a synchronization is about to occur or has occurred and the changes may be highlighted for them. Moreover, it should be noted that, because the fourth data set 214 was not initially copied into the second workspace 208, any modifications made to the fourth data set 214 are not propagated into the second workspace 208 during synchronization.

FIG. 7 shows the inverse of this synchronization. Specifically, the server system, administrator system, and/or collaborative management software propagates the modification done in the second workspace 208 to the first workspace 204. More specifically, the modifications made to any data of the second workspace 208 that is marked with the editor token, such as the fifth data set 216, is propagated to the third data set 212 so the users 202 of the first workspace 204 can take into account these modifications in their work. In some embodiments, the users 202 are alerted that a synchronization is about to occur or has occurred and the changes may be highlighted for them.

Figure 8:
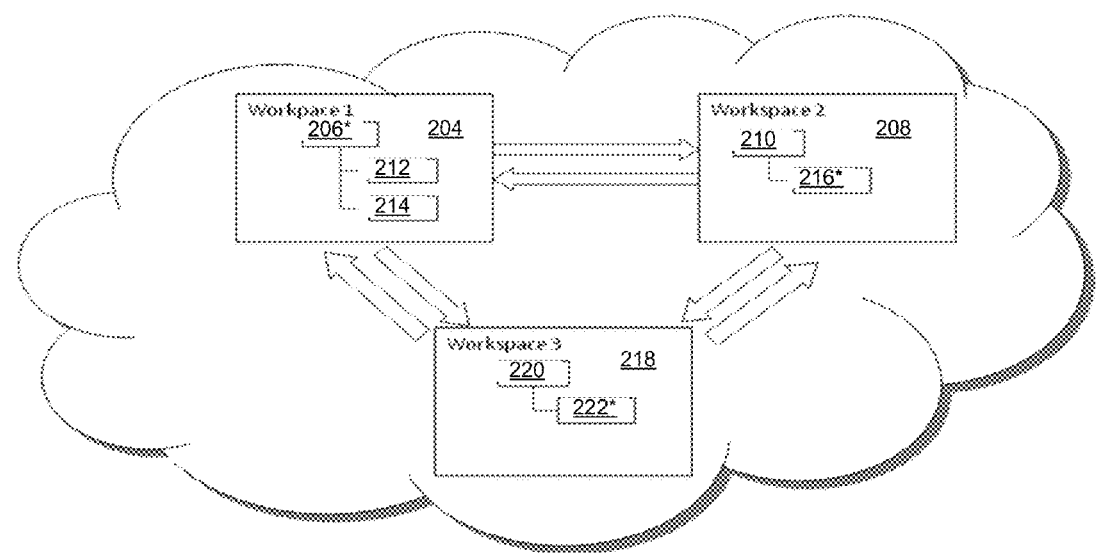

FIG. 8 illustrates that the methods described above is applicable to environments with more than two workspaces. As shown in FIG. 8, synchronization can occur between the first workspace 204 and the second workspace 208, between the second workspace 208 and a third workspace 218 having a sixth data set 220 and a seventh data set 222, and between the first workspace 204 and the third workspace 218. It should be understood that the embodiments described herein are not limited to any particular number of workspaces.

Figure 9:
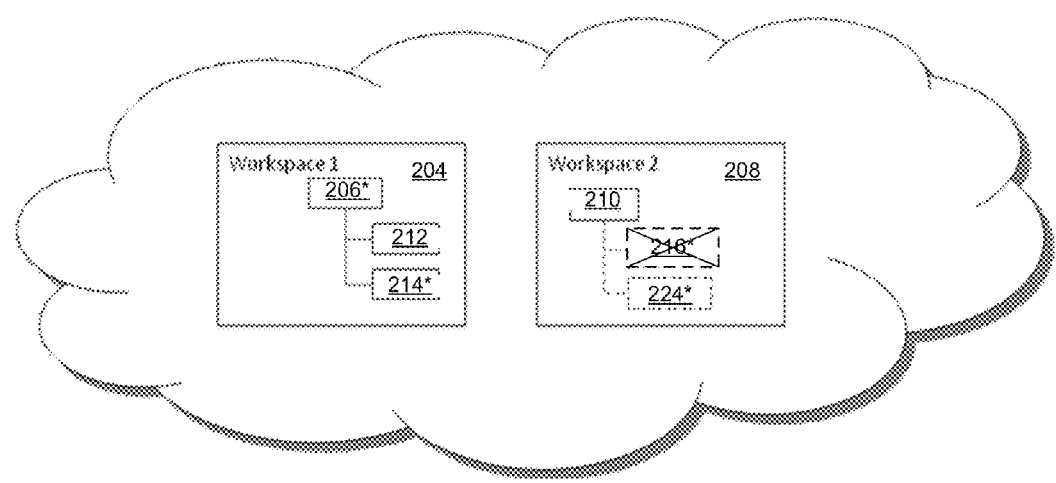

FIG. 9 illustrates that the concept of synchronization can apply not only to data modification operations but also to data creation operations and data deletion operations. For example, during use the fifth data set 216 is deleted and a new eighth data set 224 is created in the second workspace 208. Because the fifth data set 216 is marked with the editor token its modifications are controlling over the third data set 212 in the first workspace 204. Accordingly, the third data set 212 is deleted during synchronization because the fifth data set 216 was deleted during use. Similarly, a new ninth data set (not shown) will be created in first workspace 204 during synchronization because of the eighth data set 224 was created in second workspace 208 during use.

Figure 10:
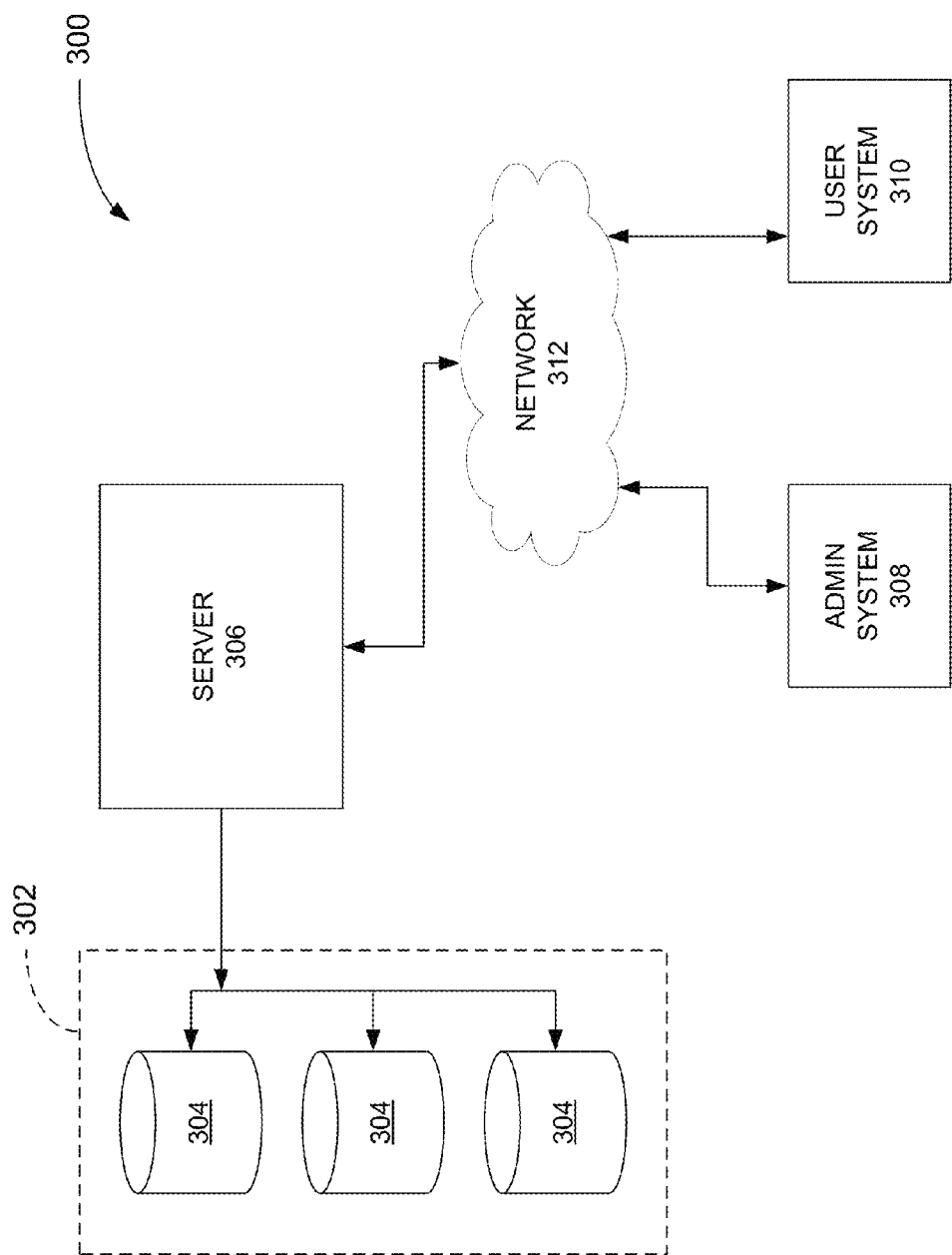
FIG. 10 is a schematic block diagram of an exemplary computer system configured to enable simultaneous, collaborative workspace usage.

FIG. 10 is a schematic block diagram of an exemplary computer system 300 for use in collaborative design or other collaborative workspace usage, such as the processes described above and/or additional processes that may be related to those described above. In an exemplary embodiment, a memory area 302 includes one or more storage devices 304 for use in storing data, such as engineering data including, for example, product data, manufacturing data, simulation data, architecture, engineering, and construction (AEC) data, biological data, engineering systems data, requirements data, functionality or test data, or any other suitable data type that can be used in a collaborative environment. In some embodiments, the memory area 302 is coupled to a server system 306, which is in turn coupled to an administrator system 308 and/or a user system 310 via a network 312. The storage devices 304 may be embodied as one or more databases, may be located at a single or at multiple geographical sites, or may be integrated with the server system 306. Notably, the administrator system 308 and/or the user system 310 may be any suitable computing device that enables the functions and operations described herein. For example, the administrator system 308 and/or the user system 310 may be a desktop computer, a laptop computer, a tablet computer, a Personal Digital Assistant (PDA), a mobile or cellular phone, a smartphone, or any other suitable computing device.

As can be appreciated, the network 312 can be a public network, such as the Internet, or a private network such as an LAN or WAN network, or any combination thereof and can also include PSTN or ISDN sub-networks. The network 312 can also be wired, such as an Ethernet network, or can be wireless such as a cellular network including EDGE, 3G and 4G wireless cellular systems. The wireless network can also be WiFi, Bluetooth, or any other wireless form of communication that is known. Thus, the network 312 is merely exemplary and in no way limits the scope of the present advancements.

As one of ordinary skill in the art would recognize, the administrator system 308 and/or the user system 310 can be any suitable computer system such as the one described below with reference to FIG. 11, or any other computing system that is known. Moreover, it should be understood that the server system 306 is configured to perform the processes described above and/or any additional processes that may be related to those described above.

The server system 306 stores the computer-readable instructions to execute the processes described above and provides these instructions via the network 312 to the administrator system 308 and/or the user system 310. Moreover, the server system 306 can also provide data from the memory area 302 as needed to the administrator system 308 and the user system 310. As such, FIG. 10 includes implementations of the computer system 300 via cloud computing, distributed computing, and the like.

Figure 11:
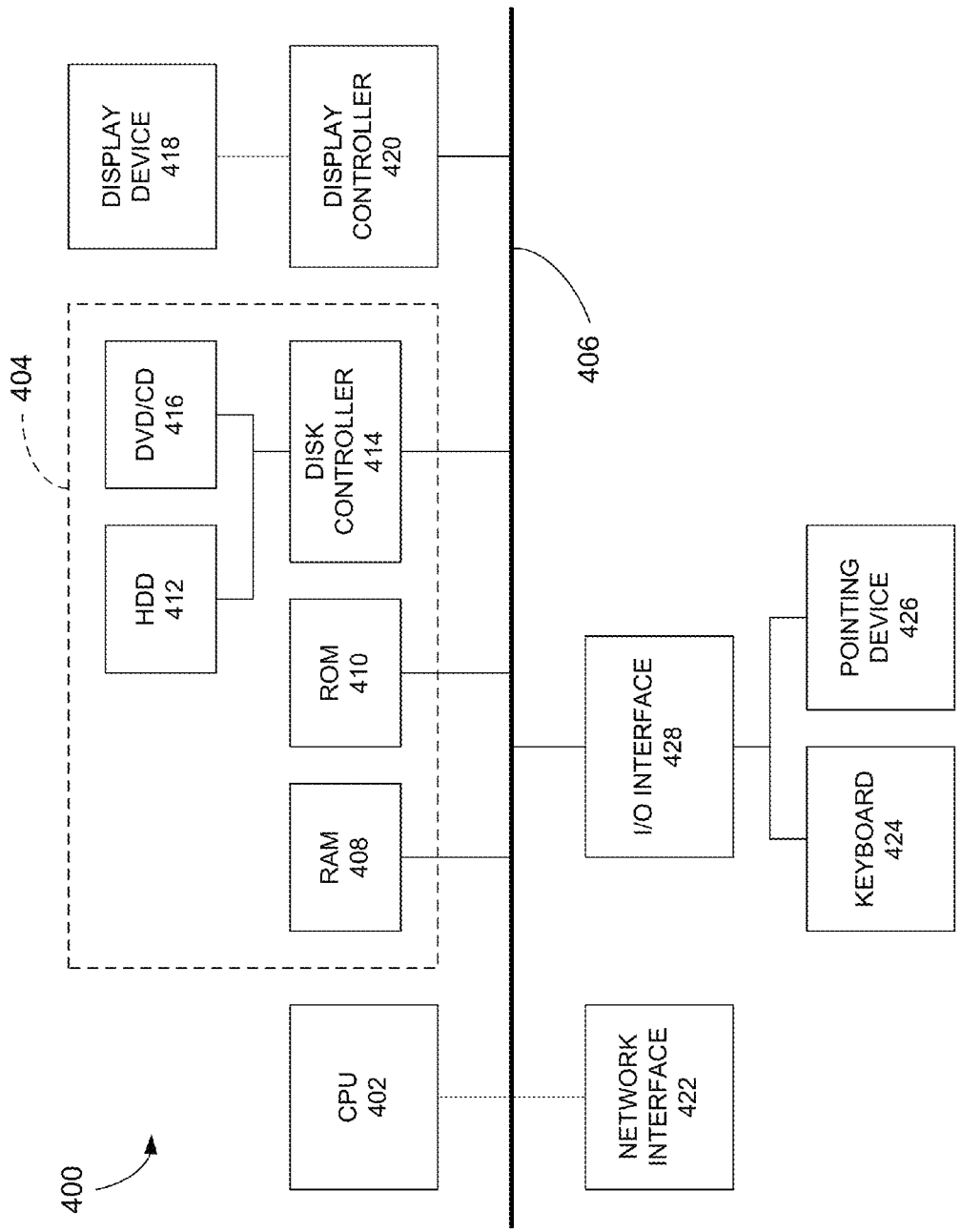
FIG. 11 is a schematic block diagram of an exemplary computer architecture for use with the computer system shown in FIG. 10.

FIG. 11 is a schematic block diagram of an exemplary computer architecture 400 for use with the server system 306, the administrator system 308, and/or the user system 310 (each shown in FIG. 10).

In an exemplary embodiment, the computer architecture 400 includes one or more processors 402 (CPU) that performs the processes described above and/or any additional processes that may be related to those described above. It should be understood that the term "processor" refers generally to any programmable system including systems and microcontrollers, reduced instruction set circuits (RISC), application-specific integrated circuits (ASIC), programmable logic circuits, and/or any other circuit or processor capable of executing the functions described herein. The above examples are exemplary only and, thus, are not intended to limit in any way the definition and/or meaning of the term "processor."

The steps of the processes described above and/or any additional processes that may be related to those described above may be stored as computer-executable instructions in, for example, a memory area 404 that is operably and/or communicatively coupled to the processor 402 by a system bus 406. A "memory area," as used herein, refers generally to any means of storing program code and instructions executable by one or more processors to aid in automatically aligning one or more secondary objects using an alignment tool. The memory area 404 may include one, or more than one, forms of memory. For example, the memory area 404 may include random-access memory (RAM) 408, which can include non-volatile RAM, magnetic RAM, ferroelectric RAM, and/or other forms of RAM. The memory area 404 may also include read-only memory (ROM) 410 and/or flash memory and/or electrically-programmable read-only memory (EEPROM). Any other suitable magnetic, optical, and/or semiconductor memory, such as a hard-disk drive (HDD) 412, by itself or in combination with other forms of memory, may be included in the memory area 404. HDD 412 may also be coupled to a disk controller 414 for use in transmitting and receiving messages to and from the processor 402. Moreover, the memory area 404 may also be, or may include, a detachable or removable memory 416, such as a suitable cartridge disk, CD-ROM, DVD, or USB memory. The above examples are exemplary only and, thus, are not intended to limit in any way the definition and/or meaning of the term "memory area."

The computer architecture 400 also includes a display device 418 that is coupled, such as operatively coupled, to a display controller 420. The display controller 420 receives data via the system bus 406 for display by the display device 418. The display device 418 may be, without limitation, a monitor, a television display, a plasma display, a liquid crystal display (LCD), a display based on light-emitting diodes (LED), a display based on organic LEDs (OLED), a display based on polymer LEDs, a display based on surface-conduction electron emitters, a display including a projected and/or reflected image, or any other suitable electronic device or display mechanism. Moreover, the display device 418 may include a touchscreen with an associated touchscreen controller. The above examples are exemplary only and, thus, are not intended to limit in any way the definition and/or meaning of the term "display device."

In addition, the computer architecture 400 includes a network interface 422 for use in communicating with a network (not shown in FIG. 11). Moreover, the computer architecture 400 includes one or more input devices, such as a keyboard 424 and/or a pointing device 426, such as a roller ball, mouse, touchpad, and the like. The input devices are coupled to and controlled by an input/output (I/O) interface 428, which is further coupled to the system bus 406.

A description of the general features and functionality of the display device 418, keyboard 424, pointing device 426, as well as the display controller 420, disk controller 414, network interface 422, and I/O interface 428 is omitted herein for brevity as these features are known.

Exemplary embodiments of systems, methods, and computer-readable media for use in providing simultaneous, collaborative workspace usage are described above in detail. The systems, methods, and computer-readable media are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A client computers and servers, such as those described herein, includes at least one processor or processing unit and a system memory. The client computers and servers typically have at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Exemplary computer-executable components for use in or by the processes described above include, but are not limited to only including, a data management component that causes the server system 306 (shown in FIG. 10) or the processor 402 (shown in FIG. 11) to store data in the memory area 302 (shown in FIG. 10) or the memory area 404 (shown in FIG. 11) such that the data is organized into a plurality of workspaces including a first workspace 204 (shown in FIGS. 2-9). As described above, the data may be engineering data, financial data, customer data, or any other suitable data types. Engineering data may include, for example, product data, manufacturing data, simulation data, architecture, engineering, and construction (AEC) data, biological data, engineering systems data, requirements data, functionality or test data, or any other suitable data type that can be used in a collaborative environment.

The components also include a workspace management component that causes the server system 306 or the processor 402 to create a second workspace 208 (shown in FIGS. 2-9) within memory area 302 or memory area 404. The workspace management component also causes the server system 306 or the processor 402 to copy at least a portion of the data of the first workspace 204 into the second workspace 208, and enables a user 202 (shown in FIGS. 2-7) of one of a plurality of client computers or user systems 310 (shown in FIG. 10) to edit either the first workspace 204 or the second workspace 208. Moreover, the workspace management component causes the server system 306 or the processor 402 to compare the first workspace 204 and the second workspace 208 to determine the scope of the modifications made, and to synchronize the first workspace 204 and the second workspace 208 based on the comparison.

In some embodiments, the workspace management component causes the server system 306 or the processor 402 to detect when multiple users 202 are accessing the first workspace 204 and to create the second workspace 208 to enable simultaneous editing of the first workspace 204 and the second workspace 208. Moreover, in some embodiments, the workspace management component causes the server system 306 or the processor 402 to create the second workspace 208 such that it includes a second data set 210 (shown in FIGS. 2-9) that is a copy of at least a portion of a first data set 206 (shown in FIGS. 2-9) of the first workspace 204. In such embodiments, the workspace management component causes the server system 306 or the processor 402 to designate either the first data set 206 or the second data set 210 as editable by one of the users 202 such that the other of the first data set 206 and the second data set 210 is locked. In such embodiments, the workspace management component also causes the server system 306 or the processor 402 to detect edits made to the first data set 206 and to synchronize the first data set 206 and the second data set 210 by copying the edits to the first data set 206 into the second data set 210. Alternatively, the workspace management component causes the server system 306 or the processor 402 to detect edits made to the second data set 210 and to synchronize the first data set 206 and the second data set 210 by copying the edits to the second data set 210 into the first data set 206.

Although the present invention is described in connection with an exemplary collaborative design system environment, embodiments of the invention are operational with numerous other general purpose or special purpose collaborative design environments or configurations. The collaborative design system environment is not intended to suggest any limitation as to the scope of use or functionality of any aspect of the invention. Moreover, the collaborative design system environment should not be interpreted as having any dependency or requirement relating to any one or combination of components illustrated in the exemplary operating environment.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method comprising:
    storing global data in a server memory area such that the global data is organized into a plurality of workspaces in the server memory area including a first workspace, each workspace having respective data of the global data and each workspace being accessible by a plurality of users, at least a first portion of data of the first workspace being a first editable portion of the global data directly editable in the first workspace by the plurality of users accessing the first workspace;
    creating a second workspace within the server memory area;
    copying at least a second portion of the data from the first workspace into the second workspace, at least a portion of data of the second workspace being a second editable portion of the global data directly editable in the second workspace by the plurality of users accessing the second workspace;
    enabling simultaneous editing of the first portion of data in the first workspace and the second portion of data in the second workspace;
    comparing the data of the first workspace and the data of the second workspace to determine modifications made to the global data in the first and second workspaces; and
    synchronizing the data of the first workspace and the data of the second workspace based on the comparison, by copying the modifications directly from the second workspace to the first workspace, and copying modifications directly from the first workspace to the second workspace.

2. The computer-implemented method in accordance with claim 1, further comprising:
    detecting multiple users accessing the first workspace; and
    based on the detection, creating the second workspace to enable simultaneous editing of the data of the first workspace in the first workspace and the data of the second workspace in the second workspace.

3. The computer-implemented method in accordance with claim 1, wherein the data of the first workspace includes a first data set, said creating a second workspace comprising creating the second workspace including a second data set, the second data set including a copy of at least a portion of the first data set.

4. The computer-implemented method in accordance with claim 3, further comprising:
designating one of the first data set and the second data set as editable by a user of one of the plurality of client computers; and
designating the other of the first data set and the second data set as locked.

5. The computer-implemented method in accordance with claim 4, further comprising:
detecting edits made to the designated editable data set; and
synchronizing the first data set and the second data set by copying the edits from the designated editable data set to the designated locked data set.

6. The computer-implemented method in accordance with claim 3, wherein the first data set includes a third data set and a fourth data set, said creating a second workspace comprises creating the second workspace such that the second data set includes a fifth data set that is a copy of at least one of the third data set and the fourth data set.

7. A computer system comprising:
a plurality of client computers;
a server memory area configured to store global data organized into a plurality of workspaces in the server memory area including a first workspace, each workspace having respective data of the global data and each workspace being accessible by a plurality of users, at least a first portion of the data of the first workspace being a first editable portion of the global data directly editable in the first workspace by the plurality of users accessing the first workspace; and
a server operatively coupled to said server memory area, said server configured to:
create a second workspace within said server memory area;
copy at least a second portion of the data from the first workspace into the second workspace, at least a portion of the data of the second workspace being a second editable portion of the global data directly editable in the second workspace by the plurality of users accessing the second workspace;
enable simultaneous editing of the first portion of data in the first workspace and the second portion of data in the second workspace;
compare the data of the first workspace and the data of the second workspace to determine modifications made to the global data in the first and second workspaces; and
synchronize the data of the first workspace and the data of the second workspace based on the comparison, by copying the modifications directly from the second workspace to the first workspace, and copying modifications directly from the first workspace to the second workspace.

8. The computer system in accordance with claim 7, wherein said server is further configured to:
detect multiple users accessing the first workspace; and
based on the detection, create the second workspace to enable simultaneous editing of the data of the first workspace in the first workspace and the data of the second workspace in the second workspace.

9. The computer system in accordance with claim 7, wherein the data of the first workspace includes a first data set, said server is further configured to create the second workspace including a second data set, the second data set including a copy of at least a portion of the first data set.

10. The computer system in accordance with claim 9, wherein said server is further configured to:
designate one of the first data set and the second data set as editable by a user of one of said plurality of client computers; and
designate the other of the first data set and the second data set as locked.

11. The computer system in accordance with claim 10, wherein said server is further configured to:
detect edits made to the designated editable data set; and
synchronize the first data set and the second data set by copying the edits from the designated editable data set to the designated locked data set.

12. The computer system in accordance with claim 9, wherein the first data set includes a third data set and a fourth data set, said server is further configured to create the second workspace such that the second data set includes a fifth data set that is a copy of at least one of the third data set and the fourth data set.

13. A computer program product comprising:
one or more non-transitory computer-readable storage media having computer-executable components for use in user collaboration, said components comprising:
a data management component that when executed by at least one processor causes the at least one processor to store global data in a server memory area such that the global data is organized into a plurality of workspaces in the server memory area including a first workspace, each workspace: (i) having respective data of the global data, and (ii) each workspace being accessible by a plurality of users, at least a first portion of data of the first workspace being a first editable portion of the global data directly editable in the first workspace by the plurality of users accessing the first workspace; and
a workspace management component that when executed by at least one processor causes the at least one processor to:
create a second workspace within the server memory area;
copy at least a second portion of the data from the first workspace into the second workspace, at least a portion of data of the second workspace being a second editable portion of the global data directly editable in the second workspace by the plurality of users accessing the second workspace;
enable simultaneous editing of the first portion of data in the first workspace and the second portion of data in the second workspace in the server memory area;
compare the data of the first workspace and the data of the second workspace to determine modifications made to the global data in the first and second workspaces; and
synchronize the data of the first workspace and the data of the second workspace based on the comparison, by copying the modifications directly from the second workspace to the first workspace, and copying modifications directly from the first workspace to the second workspace.

14. The computer program product in accordance with claim 13, wherein said workspace management component further causes the at least one processor to:
detect multiple users accessing the first workspace; and
based on the detection, create the second workspace to enable simultaneous editing of the data of the first workspace in the first workspace and the data of the second workspace in the second workspace.

15. The computer program product in accordance with claim 13, wherein the data of the first workspace includes a first data set, said workspace management component further causes the at least one processor to create the second workspace including a second data set, the second data set including a copy of at least a portion of the first data set.

16. The computer program product in accordance with claim 15, wherein said workspace management component further causes the at least one processor to:
   designate one of the first data set and the second data set as editable by a user of one of said plurality of client computers; and
   designate the other of the first data set and the second data set as locked.

17. The computer program product in accordance with claim 16, wherein said workspace management component further causes the at least one processor to:
   detect edits made to the designated editable data set; and
   synchronize the first data set and the second data set by copying the edits from the editable data set to the designated locked data set.

18. The computer program product in accordance with claim 15, wherein the first data set includes a third data set and a fourth data set, said workspace management component further causes the at least one processor to create the second workspace such that the second data set includes a fifth data set that is a copy of at least one of the third data set and the fourth data set.

\* \* \* \* \*